(12) United States Patent
Gan

(10) Patent No.: US 6,469,890 B1
(45) Date of Patent: Oct. 22, 2002

(54) HARD DISK DRIVE MOUNTING DEVICE

(75) Inventor: Li Yuan Gan, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/686,354

(22) Filed: Oct. 10, 2000

(30) Foreign Application Priority Data

Jul. 18, 2000 (TW) .................................... 089212419 U

(51) Int. Cl.⁷ ................................................ G06F 1/16
(52) U.S. Cl. ................ 361/685; 360/97.01; 312/332.2; 369/82; 248/500
(58) Field of Search ....................... 361/685; 360/97.01, 360/98.01, 137, 137 D; 312/332.1, 333; 369/75.1, 82; 248/500

(56) References Cited

U.S. PATENT DOCUMENTS 5,731,952 A * 3/1998 Ohgami et al. ............. 361/687

6,317,318 B1 * 11/2001 Kim ........................... 361/685

* cited by examiner

Primary Examiner—Darren Schuberg
Assistant Examiner—Hung Van Duong
(74) Attorney, Agent, or Firm—Wei Te Chung

(57) ABSTRACT

A mounting device (10) for mounting a hard disk drive (HDD) (90) to a computer enclosure (100) includes a support bracket (12) for attaching the HDD thereto and a securing plate (14). The support bracket has a body (20) with spring fingers (22) for engaging with the computer enclosure, and the securing plate has a base (40) for engaging with the body of the support bracket. The support bracket has a pair of side walls (30), with through holes (32) defined therein, depending vertically from opposite edges of the body. The securing plate includes a spring portion (50) extending from one edge of the base, and a pulling portion (70) with a slot (72) defined therein extending from the opposite edge of the base.

14 Claims, 5 Drawing Sheets

HARD DISK DRIVE MOUNTING DEVICE

BACKGROUND OF THE INVENTION

1. Field of the Invention

The present invention relates to a hard disk drive mounting device, and particularly to a mounting device facilitating mounting of a hard disk drive to a computer enclosure.

2. The Related Art

When designing a computer, many factors must be considered. Some technical considerations are: processor speed, bus size, memory requirements, and the physical size of the computer enclosure. When positioning components within the computer enclosure, it is desirable to position some components such that they can be easily assembled, installed and removed by a user or technician. An example of such a component is a hard disk drive, which is usually first secured to a mounting device, whereupon the mounting device is secured to the enclosure. Typically, a mounting device is secured to a computer enclosure with screws or bolts.

As disclosed in Taiwan Patent Application No. 87204479, a hard disk drive is first secured to a mounting device. Then the mounting device is attached to a drive bracket of a computer enclosure with a pair of hangers on the mounting device engaging with the drive bracket. A pair of tabs on the mounting device is attached to the drive bracket by bolts, therebysecuring the hard disk drive to the enclosure. However, the process of attaching the mounting device to the enclosure by bolts is complicated and time-consuming, and requires considerable working space.

Thus it is strongly desired to provide a hard disk drive mounting device which overcomes the above problems encountered in the prior art.

SUMMARY OF THE INVENTION

Accordingly, an object of the present invention is to provide a hard disk drive (HDD) mounting device facilitating the attachment of an HDD to a computer enclosure.

To achieve the above mentioned object, an HDD mounting device constructed in accordance with the present invention comprises a support bracket having a body with spring fingers, and a securing plate having a base for engaging with the body of the support bracket. The support bracket has a pair of side walls, with through holes defined therein, depending vertically from opposite edges of the body. The securing plate includes a spring portion extending from one edge of the base, and a pulling portion with a slot defined therein extending from the opposite edge of the base Other objects, advantages and novel features of the present invention will be drawn from the following detailed embodiment of the present invention with attached drawings, in which:

DESCRIPTION OF THE PREFERRED EMBODIMENT

Figure 1:
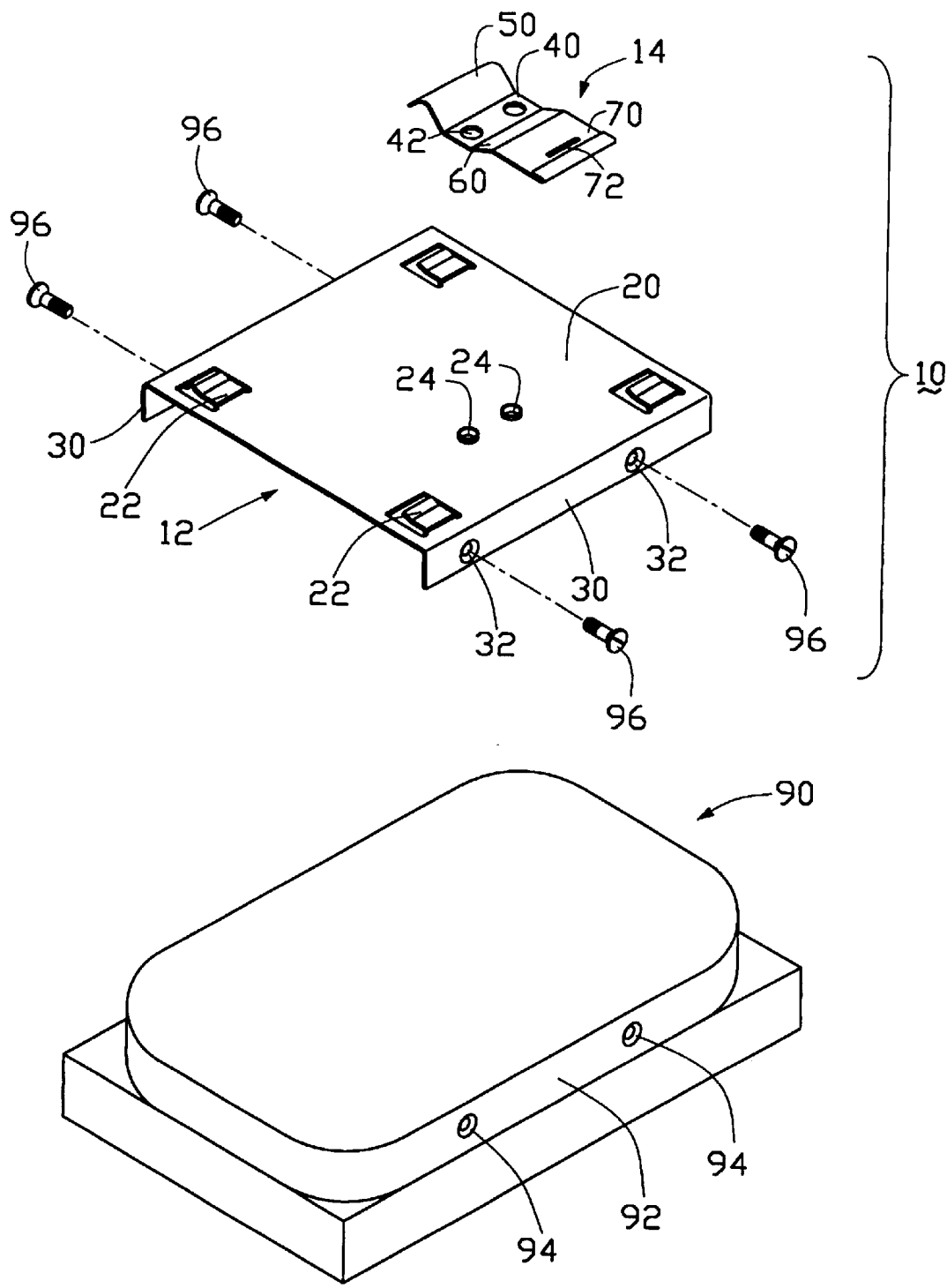
FIG. 1 is an exploded view of a mounting device of the present invention and an HDD.
Figure 2:
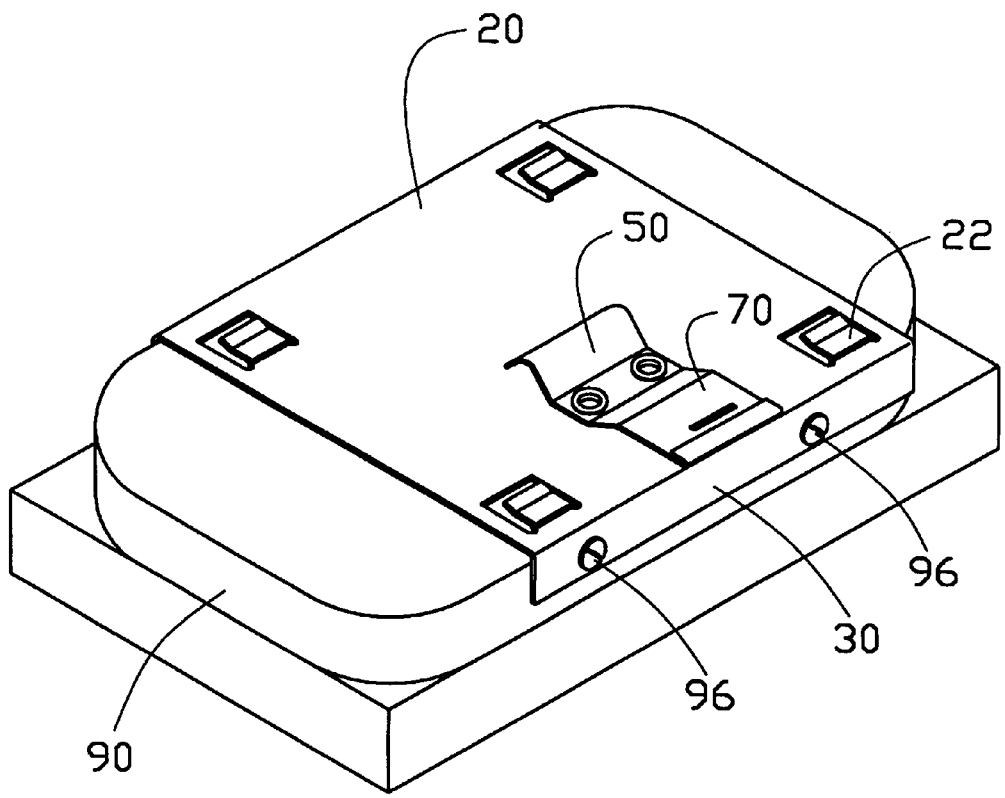
FIG. 2 is an assembled view of FIG. 1.

Referring to the attached drawings, FIGS. 1 and 2 show a hard disk drive (HDD) 90 mounted to a mounting device 10 in accordance with the present invention. The HDD 90 defines two pairs of screw holes 94 respectively located in opposite sides 92 thereof. The mounting device 10 comprises a support bracket 12 and a securing plate 14.

The support bracket 12 comprises a board body 20 and a pair of side walls 30 depending vertically from opposite edges of the board body 20. The board body 20 is a rectangular board for abutting against a top surface of the HDD 90. The board body 20 forms two pairs of spring fingers 22 which are slightly bent at free ends thereof. A pair of cylinders 24 extend upwardly from the body 20. Each side wall 30 defines a pair of through holes 32 corresponding to the pair of screw holes 94 of the HDD 90, for insertion of bolts 96 therethrough. The securing plate 14 includes a base 40 defining a pair of fixing holes 42 aligned with and receiving the correspondingcylinders 24 of the support bracket 12, and a V-shaped spring portion 50 extending from the base 40. A pulling portion 70 extends from the base 40 opposite the spring portion 50. A slot 72 is defined in the pulling portion 70, and is slightly bent. The base 40 and the pulling portion 70 are connected by a step 60.

The securing plate 14 is attached to the body 20 of the support bracket 12 with the fixing holes 42 thereof engaging withthe cylinders 24 of the support bracket 12 by conventional means such as riveting. The HDD 90 is engagingly received between the pair of side walls 30 of the support bracket 12. Two pairs of bolts 96 extend through the through holes 32 of the support bracket 12 and threadedly engage with the screw holes 94, thereby securing the HDD 90 to the mounting device 10.

Figure 3:
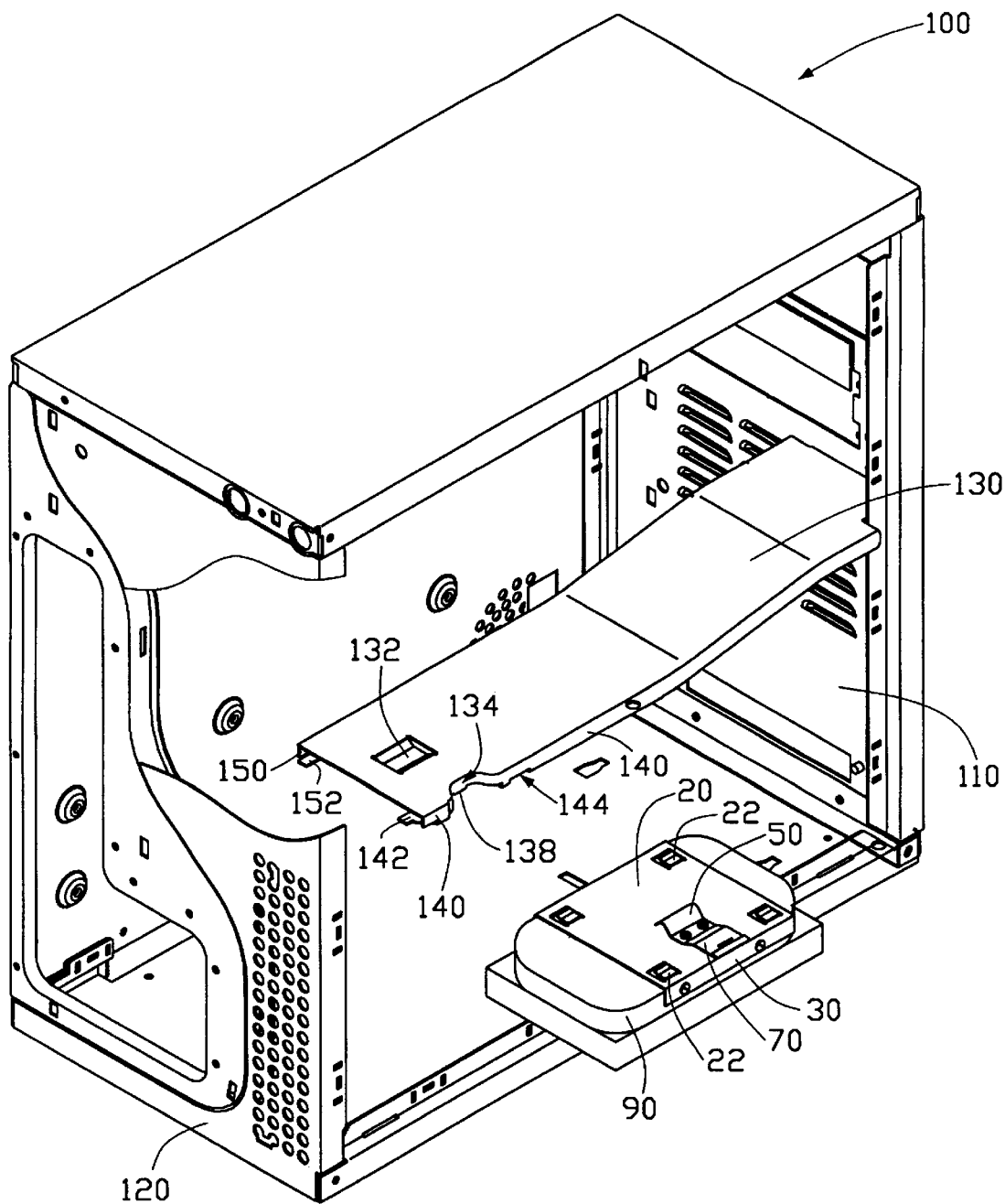
FIG. 3 is an exploded view of a computer enclosure and an assembly of the mounting device and the HDD.
Figure 4:
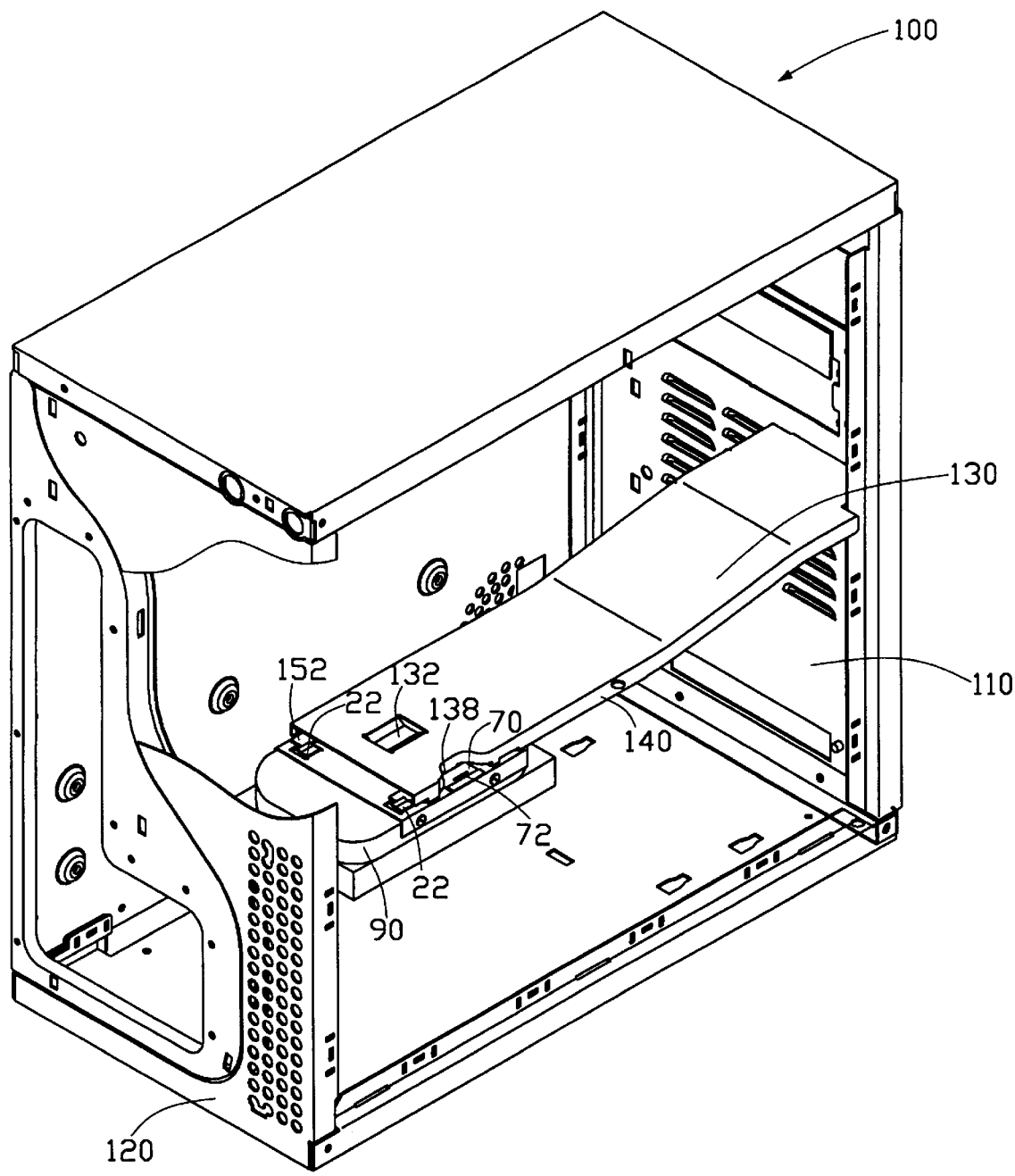
FIG. 4 is an assembled view of FIG. 3, showing the assembly of the mounting device and the HDD being partly attached to the computer enclosure.
Figure 5:
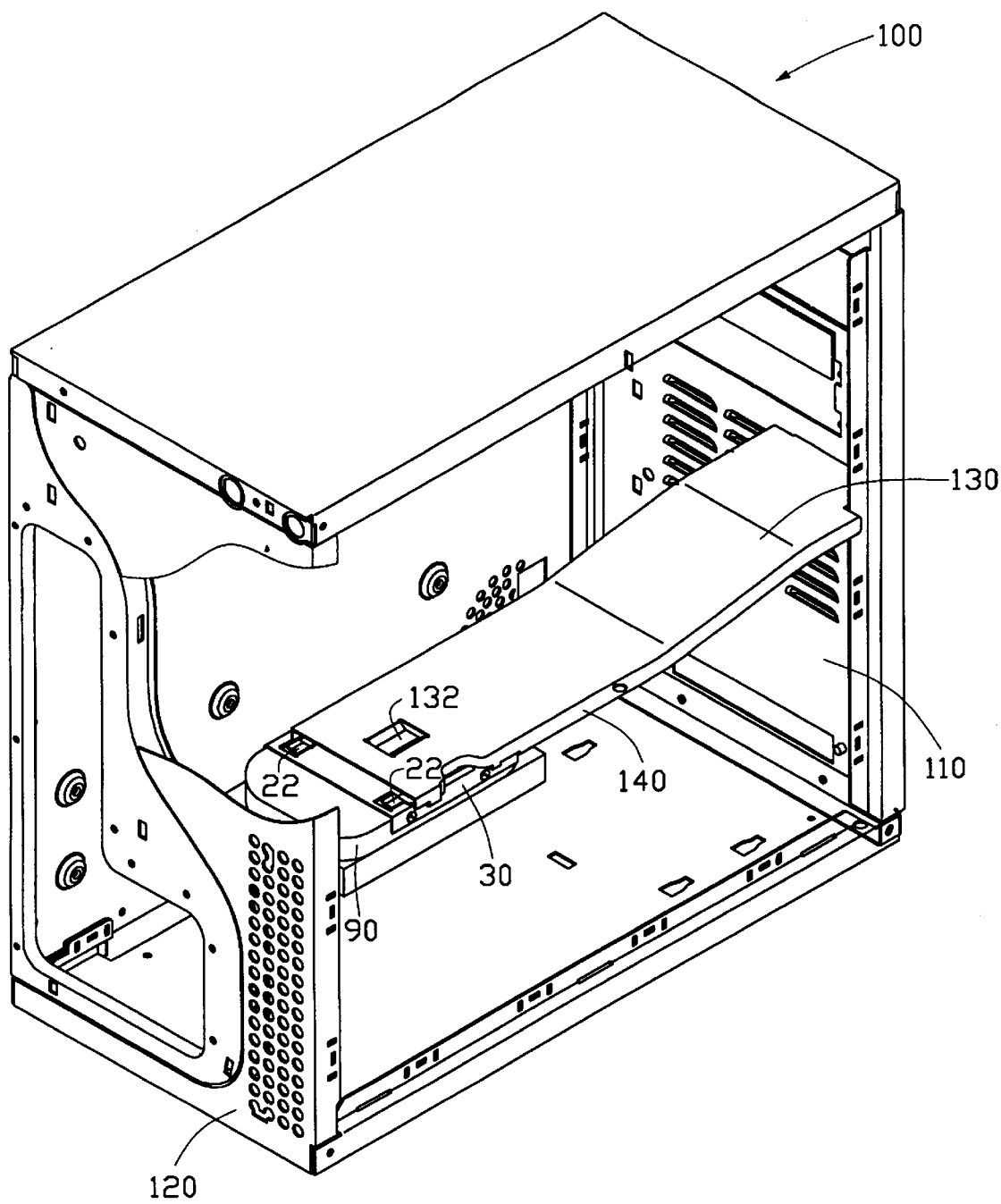
FIG. 5 is an assembled view of FIG. 3, showing the assembly of the mounting device and the HDD being completely attached to the computer enclosure.

FIGS. 3–5 show the pre-assembled HDD 90 and mounting device 10 being secured to a computer enclosure 100. Referring to FIG. 3, the computer enclosure 100 has a front panel 110, a rear panel 120 and a support bridge 130 connected to the front panel 110 and the rear panel 120. A protrusion 132 depends vertically from the support bridge 130. The support bridge 130 forms a first flange 140 and a second flange 150 respectively depending vertically from opposite sides thereof. A notch 134 is defined in the bridge 130, and a lip 138 depends vertically from the first flange 140 at the notch 134 for engagement with the slot 72 of the securing plate 14. The first flange 140 forms a pair of first hangers 142 on opposite sides of the notch 134. Each first hanger 142 extends inwardly from the first flange 140. A pair of apertures 144 is respectively defined between the pair of first hangers 142 and the first flange 140 for extension of the spring fingers 22 of the support bracket 12 therethrough. The second flange 150 forms a second elongate hanger 152 extending inwardly toward the pair of first hangers 142.

Referring to FIGS. 4 and 5, to install the support bracket 12, one pair of spring fingers 22 of the support bracket 12 extend; into the pair of apertures 144 of the support bridge 130 and then engages with the first hangers 142.The other pair of spring fingers 22 directly engages with the second hanger 152. The lip 138 of the first flange 140 of the bridge 130 is received in the slot 72 of the securing plate 14, thereby preventing the mounting device 10 from moving horizontally. The spring portion 50 of the securing plate 14 is elastically deformed to abut against the protrusion 132 of the support bridge 130, thereby preventing the mounting device 10 from moving vertically. Thus, the HDD 90 and the mounting device 10 are easily attached to the bridge 130 of the enclosure 100.

In disassembling, the pulling portion 70 of the securing plate 14 is accessed via the notch 134, and is pressed downward until the lip 138 disengages from the slot 72 of the pulling portion 70. Then the mounting device 10 and the HDD 90 can be easily removed from the support bridge 130.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting device for mounting a hard disk drive (HDD) to a computer enclosure, comprising:

a support bracket for attaching the HDD thereto, and a plurality of spring fingers extending from the support bracket for engagement with the enclosure; and a securing plate, including a base attached to the support bracket and a pulling portion extending from the base for engagement with the enclosure, wherein the support bracket forms a plurality of cylinders, and the base of the securing plate defines a plurality of corresponding fixing holes for engagement with the cylinders.

2. The mounting device as claimed in claim 1, wherein the support bracket forms a plurality of cylinders, and the base of the securing plate defines a plurality of corresponding fixing holes for engagement with the cylinders.

3. The mounting device as claimed in claim 1, wherein the support bracket includes a body and a pair of side walls each depending vertically from opposite edges of the body respectively, with the body and the side walls defining a space therebetween for receiving the HDD.

4. The mounting device as claimed in claim 1, wherein the securing plate includes at least a spring portion for firmly engaging with the enclosure.

5. The mounting device as claimed in claim 1, wherein the pulling portion defines at least a slot for engagement with the enclosure.

6. A computer comprising:

a mounting device comprising a support bracket for attaching a hard disk drive (HDD) thereto, a securing plate with a base attached to the support bracket, a pulling portion extending from the base, anda slot defined in the pulling portion; and a computer enclosure comprising a front panel, a rear panel and a support bridge connected between the front panel and rear panel for attaching the mounting device thereto, the support bridge forming at least a lip for being received in the at least a slot of the securing plate.

7. The computer as claimed in claim 6, wherein the support bracket forms a plurality of cylinders, and the base of the securing plate defines a plurality of corresponding fixing holes for engagement with the cylinders.

8. The computer as claimed in claim 6, wherein the support bracket forms a plurality of spring fingers, and the support bridge forms a plurality of hangers for engagement with the spring fingers.

9. The computer as claimed in claim 6, wherein the securing plate includes at least a spring portion extending from the base thereof for engagement with the support bridge of the computer enclosure.

10. An enclosure assembly comprising:

a support bridge defining pairs of hangers thereof;

a hard disk drive;

a support bracket secured to the hard disk drive, said support bracket including a plurality of spring fingers attached to the corresponding hangers in a horizontal direction while preventing relative movement in a vertical direction;

a securing plate attached to the support bracket, said securing plate further including a pulling portion latchably engaged with the support bridge for preventing relative movement in the horizontal direction.

11. The assembly as described in claim 10, wherein said securing plate further includes a spring portion abutting against the support bridge in the vertical direction.

12. A mounting device for mounting a hard disk drive (HDD) to a computer enclosure, comprising:

a support bracket for attaching the HDD thereto, the support bracket including a body and a pair of side walls depending vertically from opposite edges of the body respectively, the body and the side walls cooperative defining a space therebetween for receiving the HDD, a plurality of spring fingers extending from a top surface of the body for engagement with the enclosure; and a securing plate, including a base attached to the support bracket and a pulling portion extending from the base for engagement with the enclosure.

13. The mounting device as claimed in claim 12, wherein the securing plate includes at least a spring portion for firmly engaging with the enclosure.

14. The mounting device as claimed in claim 12, wherein the pulling portion defines at least a slot for engagement with the enclosure.

* * * * *